United States Patent [19]

Bodenbenner et al.

[11] 4,194,952

[45] Mar. 25, 1980

[54] PROCESS FOR REGENERATING WASTE SULFURIC ACID

[75] Inventors: Kurt Bodenbenner, Wiesbaden; Helmold von Plessen, Kelkheim, both of Fed. Rep. of Germany

[73] Assignee: Hoechst Aktiengesellschaft, Frankfurt am Main, Fed. Rep. of Germany

[21] Appl. No.: 858,899

[22] Filed: Dec. 8, 1977

[30] Foreign Application Priority Data

Dec. 11, 1976 [DE] Fed. Rep. of Germany ....... 2656236

[51] Int. Cl.$^2$ .................... C01B 17/90; B01B 1/02; B01D 19/02
[52] U.S. Cl. .................................. 203/12; 203/20; 159/46; 203/61; 423/527; 423/531; 252/321
[58] Field of Search ............ 423/523, 525, 526, 527, 423/528, 529, 531; 203/12, 20, 61; 252/321; 159/47 WL, 46 R

[56] References Cited

U.S. PATENT DOCUMENTS

| 2,426,088 | 8/1947 | Filbert | 252/321 |
| 2,819,948 | 1/1958 | Wilson | 423/527 |
| 4,065,402 | 12/1977 | Satterwhite et al. | 252/321 |

FOREIGN PATENT DOCUMENTS

| 2516173 | 11/1975 | Fed. Rep. of Germany | 423/531 |
| 47-32505 | 8/1972 | Japan | 423/531 |
| 676606 | 7/1952 | United Kingdom | 423/527 |

*Primary Examiner*—O. R. Vertiz
*Assistant Examiner*—Gary P. Straub
*Attorney, Agent, or Firm*—Curtis, Morris & Safford

[57] ABSTRACT

In the regeneration of aqueous waste sulfuric acid by distilling off water often foam is formed which severely interferes with the work-up of the acid. This formation of foam is suppressed by adding alkylsulfonic and/or alkylarylsulfonic acids.

4 Claims, No Drawings

PROCESS FOR REGENERATING WASTE SULFURIC ACID

The present invention relates to a process for the regeneration of aqueous waste sulfuric acid by evaporation.

A sulfuric acid which contains, besides water, organic and inorganic impurities, for example mineral salts, hydrogen chloride or nitric acid, is formed as a waste product in many chemical processes. The strength of an acid of this type varies within wide limits. For example, dilute acid containing 5 to approximately 60% of $H_2SO_4$ or a waste acid containing 60-80% of $H_2SO_4$ may be produced. Several processes for evaporating off the water content have been disclosed for the regeneration of acids of this type. The evaporation can be carried out either under atmospheric pressure or in vacuo (U.S. Pat. No. 3,018,166 and DT-OS No. 1,767,446). As a rule the method of evaporation is determined by the strength of the waste acid. For example, a waste acid containing 60-80% of $H_2SO_4$ can be concentrated to 95-97% of $H_2SO_4$ by the process described by H. Pauling in German Patent specification No. 299,774 (1915). More dilute acids can, inter alia, be evaporated in a circulatory evaporator (compare Chemical Economy & Engineering Review, July 1976, volume 8, No. 6, pages 42-48 and Chemie-Ing.-Technik 46 (1974), 898).

A circulatory evaporator consists of a heat exchanger which is heated by indirect means, generally by steam, and an evaporation vessel from which the aqueous fractions which have been driven off pass, via a vapor line, to a condenser. The circulation in the evaporator can be effected thermally or by means of a pump (forced circulation). The waste sulfuric acid to be concentrated, which contains 5 to 60% by weight of $H_2SO_4$, is metered into the circulation continuously. The circulating material consists of 60-80% strength acid. The acid is withdrawn at a suitable point at such a rate that the volume of acid in circulation remains virtually unchanged. The boiling point in the evaporator depends on the working pressure and the concentration of sulfuric acid which has been reached. For example, at a concentration of 70% of $H_2SO_4$ and a pressure of 760 mm Hg, the boiling point in the evaporator is 165° C., whilst at a pressure of 100 mm Hg it is only 110° C.

If the waste sulfuric acid contains organic impurities, this can lead in some cases to foaming of the waste acid in the evaporator. Then not only water vapor, but also fine-pored foam, which carries over considerable quantities of acid, passes into the condensate. At the same time the heat transfer in the evaporator is impaired, since the concentration of foam in the circulating acid also increases. As a rule, under these circumstances the evaporation comes to a more or less complete standstill.

Similar problems also occur in the Pauling process with acids which tend to foam. In the Pauling process the waste sulfuric acid is fed to a stripping column which is mounted on a kettle, made of gray cast iron, which acts as the distillation boiler. The kettle, which is fired by gas or mineral oil, is filled with boiling concentrated sulfuric acid, which is withdrawn at a rate corresponding to the feed and is cooled. The water present in the waste acid leaves the stripping column in the form of vapor. In industrial Pauling plants the temperature at the top plate of the stripping column is approximately 150° C. The vapor, which has a temperature of approximately 125° C., is removed by suction by means of water ejectors or extractor fans. The stripping column is generally made of Si cast iron and is constructed as a bubble tray column.

In the Pauling process, with acids which tend to foam, the foam forms in the stripping column. The formation of foam causes so high a pressure drop in the column that the partial vacuum in the kettle falls off or disappears completely. It is then possible for sulfuric acid, in the form of vapor, and in certain cases nitrous gases or sulfur dioxide, to escape at the seal surfaces of the kettle and the stripping column. Admittedly it is possible to compensate for the increase of pressure in the kettle by reducing the feed rates; the consequence of this, however, is a reduction in the output of the Pauling plant (FIAT Final Report No. 1187, Film K-18, pages 553-554). If much foam is formed, the heat transfer and mass transfer in the stripping column are impaired and acid-containing foam is swept into the vapor line and into the ejectors or extraction fans which maintain the partial vacuum in the kettle (compare German Patent specification No. 679,850). When waste sulfuric acid containing organic impurities is regenerated, nitric acid is added in some cases as an oxidizing agent, for example being put into the kettle through a dip tube. With waste acid which tends to foam, the formation of foam is in this case frequently further enhanced or the stability of the foam is increased. A viscous foam with a fine lamellar structure is then formed, which only collapses slowly.

Attempts to suppress such foams with customary anti-foaming agents, such as, for example, octanol, tributyl phosphate or silicone foam removers, are unsuccessful, since these substances rapidly decompose in the hot acid and must therefore be fed into the apparatus at such a rate that the waste acids are contaminated additionally, to an inadmissible extent, by the substances and/or by their degradation products.

The problem was, therefore, to find a process which would make it possible to suppress the evolution of foam when evaporating aqueous waste sulfuric acid. This problem is solved by the process indicated in the main claim. The process according to the invention can be used at normal pressure, but also in vacuo, in circulatory evaporators, in H. Pauling's process and in other evaporation processes for waste sulfuric acid which are in themselves known. It is particularly suitable for regenerating 5-60% strength waste sulfuric acid in a circulatory evaporator, 60-80% strength acid being produced, or for evaporating 60-80% strength $H_2SO_4$ in a Pauling plant, approximately 95-97% strength $H_2SO_4$ being produced.

Suitable alkylsulfonic acids are $C_5$ to $C_{30}$ alkylsulfonic acids, in particular linear $C_8$ to $C_{28}$ alkylsulfonic acids, preferably $C_{12}$ to $C_{18}$ alkylsulfonic acids. Compounds which can be employed as alkylarylsulfonic acids are, in particular, those which contain 1 to 3 alkyl groups having a total of 6 to 20 carbon atoms, such as, for example triisopropylbenzenesulfonic acid. Preferred compounds are those having 1 or 2 sulfonic acid groups, and monoalkylbenzene derivatives having a $C_6$-$C_{20}$ side chain, for example dodecylbenzenesulfonic acid, or 4-alkyldiphenyl oxide-sulfonic acids, for example 4-dodecyldiphenyl oxide-disulfonic acid. The concentration of the sulfonic acids in the waste sulfuric acid can vary within wide limits and is determined mainly by the impurities in the acid. Contents of 0.001% to 3% by weight, preferably 0.005% to 1%, of alkylsulfonic and- /or alkylarylsulfonic acids, relative to the quantity of waste sulfuric acid, have proved successful. The alkylsulfonic and/or alkylarylsulfonic acids used as foam removers can be added in a solvent-free form as free sulfonic acids or in the form of their salts, for example as the sodium sulfonates. They can also be used dissolved or suspended in an advantageous manner in suitable solvents, such as water and sulfuric acid, or in diluents, in particular nitrobenzene.

In order to prevent the formation of foam, the alkylsulfonic and/or alkylarylsulfonic acids can be mixed in one of the cited forms into the waste acid and this acid can then be fed into the apparatus. It is equally possible, in the process according to the invention, to feed the alkylsulfonic and/or alkylarylsulfonic acids into the regeneration apparatus in one of the forms cited, separately from the waste acid. The anti-foaming action of the alkylsulfonic and/or alkylarylsulfonic acids is surprising, because other compounds with a similar structure, such as, for example, oleic acid N-methyl-tauride or ligninsulfonate have no action.

The anti-foaming action is also displayed in the process according to the invention by the alkylsulfonic and/or alkylarylsulfonic acids in the presence of nitric acid, which, as is known, is sometimes added as an oxidizing agent for organic impurities in the waste sulfuric acid. This fact is surprising, since nitric acid can be used in a known manner for the oxidative degradation of sulfonic acids contained in waste sulfuric acid (DOS No. 2,516,173). Furthermore, the alkylsulfonic and/or alkylarylsulfonic acids display, surprisingly, a decidedly long-term action in the process according to the invention and in this respect differ from other substances which also have an anti-foaming effect under these conditions, such as, for example, nitrobenzene. It can be assumed from this long-term action of the alkylsulfonic and/or alkylarylsulfonic acids that these compounds are very stable, chemically, in particular in the presence of nitric acid.

Nitrobenzene or other aromatic nitro compounds which are free from amino and hydroxyl groups display an anti-foaming action which sets in rapidly, but which in most cases dies away speedily owing to the volatility in steam of these compounds.

Because of the anti-foaming action of nitrobenzene or other aromatic nitro compounds which are free from amino and hydroxyl groups, the joint use of alkylsulfonic and/or alkylarylsulfonic acids together with nitro compounds have proved successful in the process according to the invention. For example, it is advantageous to employ a solution or suspension of the alkylsulfonic and/or alkylarylsulfonic acids in the said nitro compounds. When such solutions or suspensions of alkylsulfonic and/or alkylarylsulfonic acids in the said nitro compounds, for example nitrobenzene, are used, the anti-foaming action of the nitro compounds, which sets in rapidly, is combined in an advantageous manner with the long-lasting anti-foaming action of the alkylsulfonic and/or alkylarylsulfonic acids. At the same time, the admixture of the solvent can improve the distribution of the non-volatile alkylsulfonic and/or alkylarylsulfonic acids and thereby intensify their action.

Organic impurities in the waste sulfuric acid can lead to the formation of foam in the regeneration apparatus (U.S. Pat. specification No. 2,191,195, FIAT Final Report 1187, Film K-18, page 619). In this case it is difficult, or usually even impossible, to work up the acid, since, in the presence of foam, not only is the heat and mass transfer obstructed, compensation for which could be made to a certain extent by reducing evaporative output, but foaming-over, in most cases sudden, of the contents of the apparatuses, also results, thus leading to an undesirable carry-over of waste sulfuric acid into the condensate. These problems are solved by the present invention.

EXAMPLES

Tests were carried out in a circulatory evaporator and in a Pauling apparatus under the specific conditions of these process stages.

(1) Tests in the circulatory evaporator 600 ml of 70% strength sulfuric acid were initially introduced into a forced circulation evaporator made of glass and equipped with a means of heating heat transfer oil, a cooler for the waste sulfuric acid which has been concentrated and flows out and a descending condenser for the vapors, and were heated to a temperature of 160° C. 750 ml/hour of waste sulfuric acid (40% of $H_2SO_4$; 0.57% of C; and 0.15% of N) were then metered in continuously. The boiling point in the evaporator was kept at 160° C., which corresponds to an acid concentration of 70% of $H_2SO_4$ at normal pressure. The vapors and the re-concentrated waste sulfuric acid were withdrawn continuously via the relevant cooling devices. When foam occurred, just sufficient anti-foaming agent to suppress the formation of foam was put into the evaporator. The quantity of anti-foaming agent required for this purpose was determined.

| Test | Anti-foaming agent | Quantity of anti-foaming agent required in %, relative to 40% strength acid |
|---|---|---|
| 1.1 | — | re-concentration not possible |
| 1.2 | Octanol-1 | 10 (black resins formed) |
| 1.3 | Secondary linear alkylsulfonate ($C_{12}$-$C_{18}$) | 0.15 |
| 1.4 | Dodecylbenzenesulfonic acid | 0.20 |
| 1.5 | 1:1 mixture of dodecylbenzenesulfonic acid/nitrobenzene | 0.13 |

(2) Tests in a Pauling apparatus

Tests were carried out in a Pauling apparatus made of glass, which consisted of an electrically heated 1 l round-bottomed flask and a dephlegmating column 30 cm long, packed with glass helices. The water which was stripped off via the column was condensed by means of a descending Liebig condenser. For each of the tests, 990 g of concentrated (95.8% strength) $H_2SO_4$ (analytical grade) and 10 g of 100% strength $HNO_3$ (analytical grade) were initially introduced into the round-bottomed flask and were heated and a waste sulfuric acid (69.0% of $H_2SO_4$; 1% of C; 0.26% of total N; and 0.06% of ash) which originated from the production of dye precursors and had a strong tendency to foam, was then metered in. Further nitric acid, mixed with concentrated $H_2SO_4$ (analytical grade) in a weight ratio of 1:1, was added to the round-bottomed flask which acted as the distillation boiler. The anti-foaming agent was added to the top layer of the glass helices in a quantity of, for the most part, 50 μl. The action of the anti-foaming agent was measured by the time required until the free space of the dephlegmating column and the Liebig condenser on top of it (80 ml) had become full of foam.

| Test No. | Quantity of waste sulfuric acid employed g | Quantity of 1:1 HNO$_3$-H$_2$SO$_4$ employed g | Anti-foaming agent | Anti-foaming agent: form in which added | Charge of anti-foaming agent according to Column 5 | Time required for the formation of foam, seconds |
|---|---|---|---|---|---|---|
| 2.1 | 6 | 1 | — | — | — | 38 |
| 2.2 | 8 | 0 | Nitrobenzene | pure | 50 μl | 20 |
| 2.3 | 62 | 9 | Sodium dodecyl-benzenesulfonate | mixture of 10 g of H$_2$O and 10 g of anti-foaming agent | 50 μl | 357 |
| 2.4 | 44 | 3 | 4-Dodecyldiphenyl oxide-disulfonate | pure | 50 mg | 150 |
| 2.5 | 409 | 48 | Secondary linear alkylsulfonate (C$_{12}$-C$_{18}$) | mixture of 18 g of H$_2$O and 2 g of anti-foaming agent | 500 μl | 2,009 |

What is claimed is:

1. In a process for the concentration of aqueous waste sulfuric acid by evaporating water therefrom during which the acid tends to foam, the improvement which comprises adding to, prior to or during said concentration by evaporation but subsequent to contamination of the waste acid, and maintaining in said acid an amount of defoamer consisting of an agent selected from the group consisting of alkylsulfonic acids and the salts thereof, monoalkylbenzene monosulfonic acids, the alkyl moiety of each said monosulfonic acid being of from 6 to 20 carbon atoms, and the salts thereof, monoalkylbenzene disulfonic acids, the alkyl moiety of each said disulfonic acid being of from 6 to 20 carbon atoms, and the salts thereof, and mixtures thereof, which is sufficient to effect suppression of the formation of foam.

2. A process as claimed in claim 1, wherein a sulfuric acid of approximately 60–80% strength is concentrated in a Pauling plant to approximately 95–97% of H$_2$SO$_4$.

3. A process as claimed in claim 1, wherein a waste sulfuric acid of 5–60% strength by weight is concentrated in a circulatory evaporator to 60–80% strength by weight H$_2$SO$_4$.

4. A process as claimed in claim 3, wherein the waste sulfuric acid is of from 20 to 60% strength by weight.

* * * * *